(12) United States Patent
Bofill et al.

(10) Patent No.: US 9,586,692 B2
(45) Date of Patent: Mar. 7, 2017

(54) ENGINE INLET CONFIGURATION

(71) Applicant: Sikorsky Aircraft Corporation, Stratford, CT (US)

(72) Inventors: Steven Bofill, Stamford, CT (US); Scott A. Chasen, Orange, CT (US); Joseph Lawrence Simonetti, Southbury, CT (US); Donald William Lamb, Jr., North Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 152 days.

(21) Appl. No.: 14/252,236

(22) Filed: Apr. 14, 2014

(65) Prior Publication Data

US 2015/0291288 A1  Oct. 15, 2015

(51) Int. Cl.
B64D 33/02  (2006.01)

(52) U.S. Cl.
CPC ...... B64D 33/02 (2013.01); *B64D 2033/0246* (2013.01); *B64D 2033/0253* (2013.01)

(58) Field of Classification Search
CPC .................................................. B64D 33/02
USPC ...................................................... 244/53 B
See application file for complete search history.

(56) References Cited

U.S. PATENT DOCUMENTS

| | | | |
|---|---|---|---|
| 2,503,172 A | 4/1950 | Pullin | |
| 5,433,070 A * | 7/1995 | Amelio | F02C 7/04 137/15.1 |
| 5,829,244 A | 11/1998 | Ciccia et al. | |
| 6,499,285 B1 * | 12/2002 | Snyder | B64D 33/02 244/53 B |
| 6,598,384 B1 | 7/2003 | Adkins | |
| 6,990,798 B2 * | 1/2006 | Bouchard | F02C 7/04 137/15.1 |
| 7,192,462 B2 * | 3/2007 | Stelzer | B01D 46/0005 123/198 E |
| 8,096,199 B2 | 1/2012 | Osswald et al. | |
| 8,113,461 B2 * | 2/2012 | Nannoni | B64D 33/08 244/17.11 |
| 8,998,130 B2 * | 4/2015 | Dailey | B64D 33/02 244/53 B |
| 2005/0229558 A1 | 10/2005 | Stelzer et al. | |
| 2013/0087663 A1 | 4/2013 | Dailey et al. | |
| 2013/0313371 A1 | 11/2013 | Lamb, Jr. et al. | |

FOREIGN PATENT DOCUMENTS

EP  1482228 B1  5/2008

OTHER PUBLICATIONS

Notification of Transmittal of the International Search Report and the Written Opinion of the International Searching Authority; PCT/US2015/025507; Mailed Aug. 5, 2015; ISR 7 pages; WO 6 pages.

* cited by examiner

*Primary Examiner* — Brian M O'Hara
*Assistant Examiner* — Keith L Dixon
(74) *Attorney, Agent, or Firm* — Cantor Colburn LLP

(57) ABSTRACT

An engine inlet assembly includes an inlet duct having a first inlet duct leg and a second inlet duct leg, the first inlet duct leg and the second inlet duct leg extending toward a common inlet duct outlet located at an engine inlet. The first inlet duct leg and the second inlet duct leg are fixedly secured to an airframe of an aircraft at an air inlet. The duct outlet has a floating interface with the engine inlet.

13 Claims, 4 Drawing Sheets

ENGINE INLET CONFIGURATION

BACKGROUND

The subject matter disclosed herein relates to engine inlets, more specifically, to installation of engine inlet ducts and/or cowling.

Engines for, for example, aircraft such as helicopters or other rotorcraft utilize engine inlet ducting to direct airflow into the compressor of the engine. Some systems, for example, single engine systems, utilize a bifurcated inlet duct, which takes two airflow streams and directs them to the compressor inlet. The duct extends from an inlet located at a portion of the airframe such as the main rotor pylon (MRP) and extends through the MRP and airframe to an engine inlet at the engine front frame. The duct is typically secured directly and rigidly to the engine front frame at the duct outlet, and secured to the inlet at the MRP. Secured at each end, the inlet duct is held rigidly in place.

In some aircraft, however, the duct length is quite long making installation of the duct difficult due to manufacturing and assembly tolerance stackups between the engine front frame, the MRP and the inlet duct. Further, in some configurations, the inlet duct installation points may be inaccessible.

BRIEF DESCRIPTION

In one embodiment, an engine inlet assembly includes an inlet duct having a first inlet duct leg and a second inlet duct leg, the first inlet duct leg and the second inlet duct leg extending toward a common inlet duct outlet located at an engine inlet. The first inlet duct leg and the second inlet duct leg are fixedly secured to an airframe of an aircraft at an air inlet. The duct outlet has a floating interface with the engine inlet.

Additionally or alternatively, in this or other embodiments the inlet duct extends through a firewall into an engine compartment of the aircraft.

Additionally or alternatively, in this or other embodiments the firewall has an airtight seal to the engine inlet radially outboard on the inlet duct via a flexible bellows seal to prevent ingestion of an engine compartment airflow into the engine inlet.

Additionally or alternatively, in this or other embodiments a bulb seal is located at the firewall to seal between an exterior of the inlet duct and a firewall opening.

Additionally or alternatively, in this or other embodiments the inlet duct at least partially surrounds an engine shaft and mount tube.

Additionally or alternatively, in this or other embodiments the inlet duct is partially supported by the engine shaft mount tube Additionally or alternatively, in this or other embodiments each inlet duct leg is segmented between air inlet and the duct outlet.

In another embodiment, a rotary winged aircraft includes an airframe and a main rotor assembly. An engine is located at the airframe and is operably connected to the main rotor assembly to drive the main rotor assembly. An inlet duct directs an airflow to an engine inlet. The inlet duct includes a first inlet duct leg and a second inlet duct leg. The first inlet duct leg and the second inlet duct leg extend toward a common inlet duct outlet located at the engine inlet. The first inlet duct leg and the second inlet duct leg are fixedly secured to the airframe at an air inlet, and the duct outlet has a floating interface with the engine inlet.

Additionally or alternatively, in this or other embodiments the inlet duct extends through a firewall into an engine compartment of the aircraft.

Additionally or alternatively, in this or other embodiments the firewall has an airtight seal to the engine inlet radially outboard on the inlet duct via a flexible bellows seal to prevent ingestion of an engine compartment airflow into the engine inlet.

Additionally or alternatively, in this or other embodiments a bulb seal is located at the firewall to seal between an exterior of the inlet duct and a firewall opening.

Additionally or alternatively, in this or other embodiments the inlet duct at least partially surrounds an engine shaft and mount tube, connecting the engine to main rotor assembly.

Additionally or alternatively, in this or other embodiments the inlet duct is partially supported by the engine shaft mount tube.

Additionally or alternatively, in this or other embodiments each inlet duct leg is segmented between air inlet and the duct outlet.

Additionally or alternatively, in this or other embodiments the first inlet duct leg and the second inlet duct leg are located at opposing sides of the main rotor assembly.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
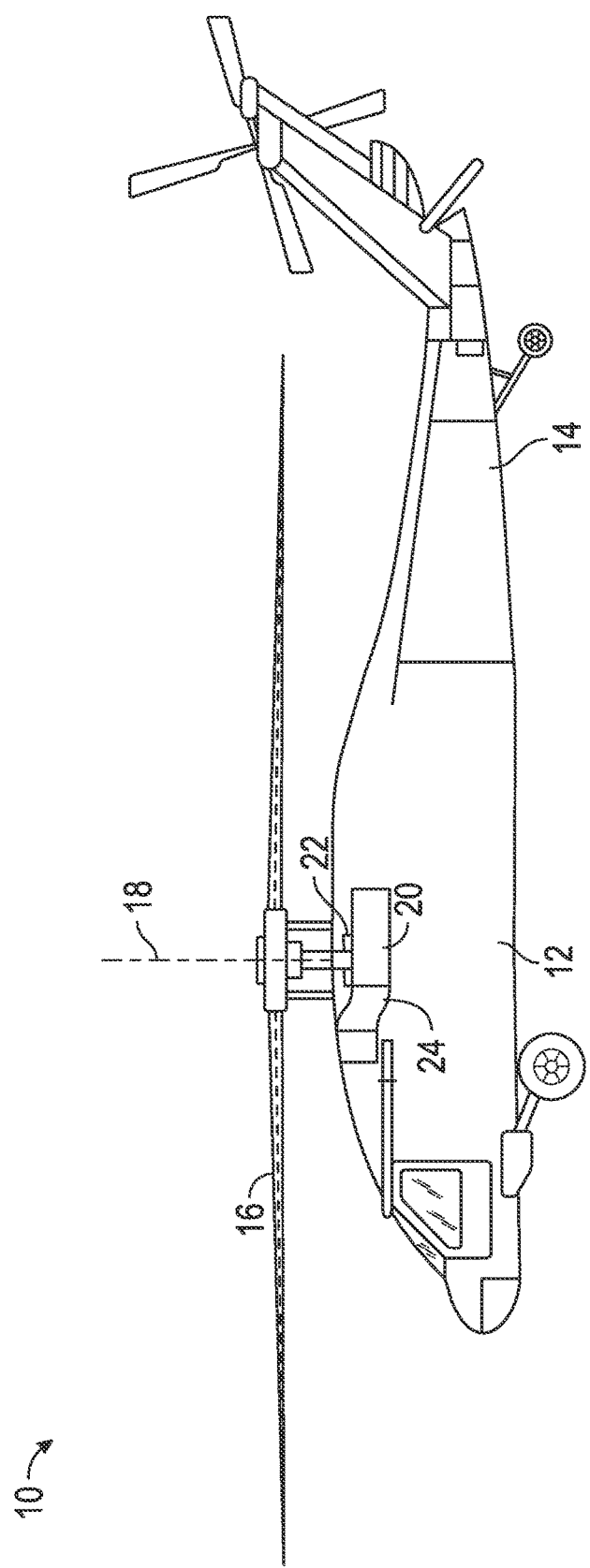
FIG. 1 is an illustration of an embodiment of a rotary winged aircraft.

Shown in FIG. 1 is a schematic view of an embodiment of a rotary wing aircraft, in this embodiment a helicopter 10. The helicopter 10 includes an airframe 12 with an extending tail 14. A rotor assembly 16 is located at the airframe 12 and rotates about a main rotor axis 18. The main rotor assembly 16 is driven by an engine 20 via a gearbox 22. To supply airflow to the engine 20, an air inlet duct 24 is provided to direct the airflow to an engine inlet 26 (FIG. 4).

Figure 2:
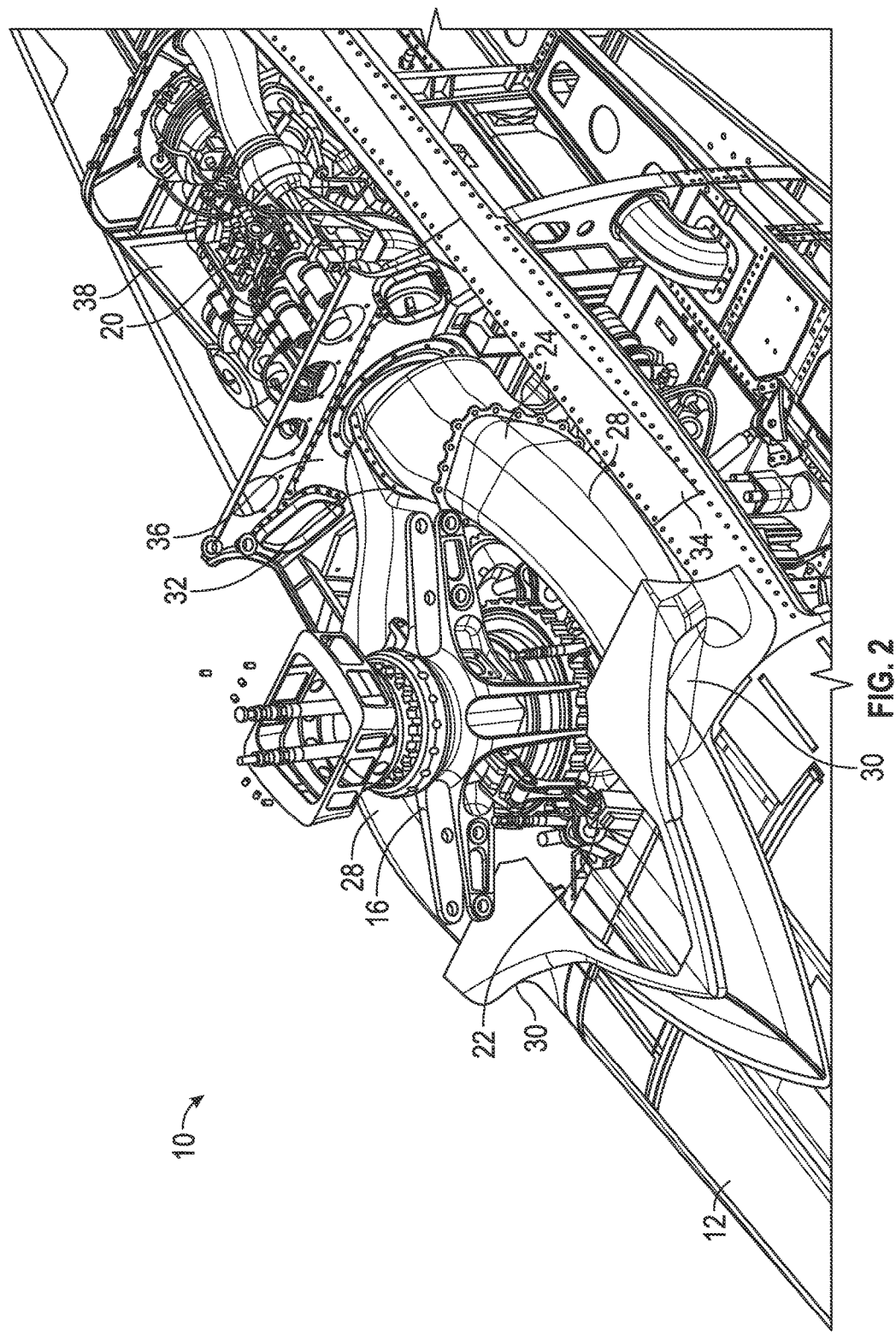
FIG. 2 is a perspective view of an embodiment of an engine inlet duct layout for a rotary winged aircraft.

Referring to FIG. 2, the inlet duct 24 is bifurcated, with duct legs 28 each extending from an inlet opening 30 at each lateral side of the airframe 12 to a single duct outlet 32 at the engine 20. The inlet duct 24 extends through a portion of the airframe 12 referred to as a main rotor pylon (MRP) 34. The MRP 34 houses the gearbox 22 for the main rotor assembly 16, which is operably connected to the engine 20. The inlet duct 24 is bifurcated at least in part to route the inlet duct 24 around the gearbox 22 and the main rotor assembly 16. The MRP 34 is bounded longitudinally by the inlet openings 30 and an engine compartment firewall 36 separating the MRP 34 from an engine compartment 38 at which the engine 20 is located.

Figure 3:
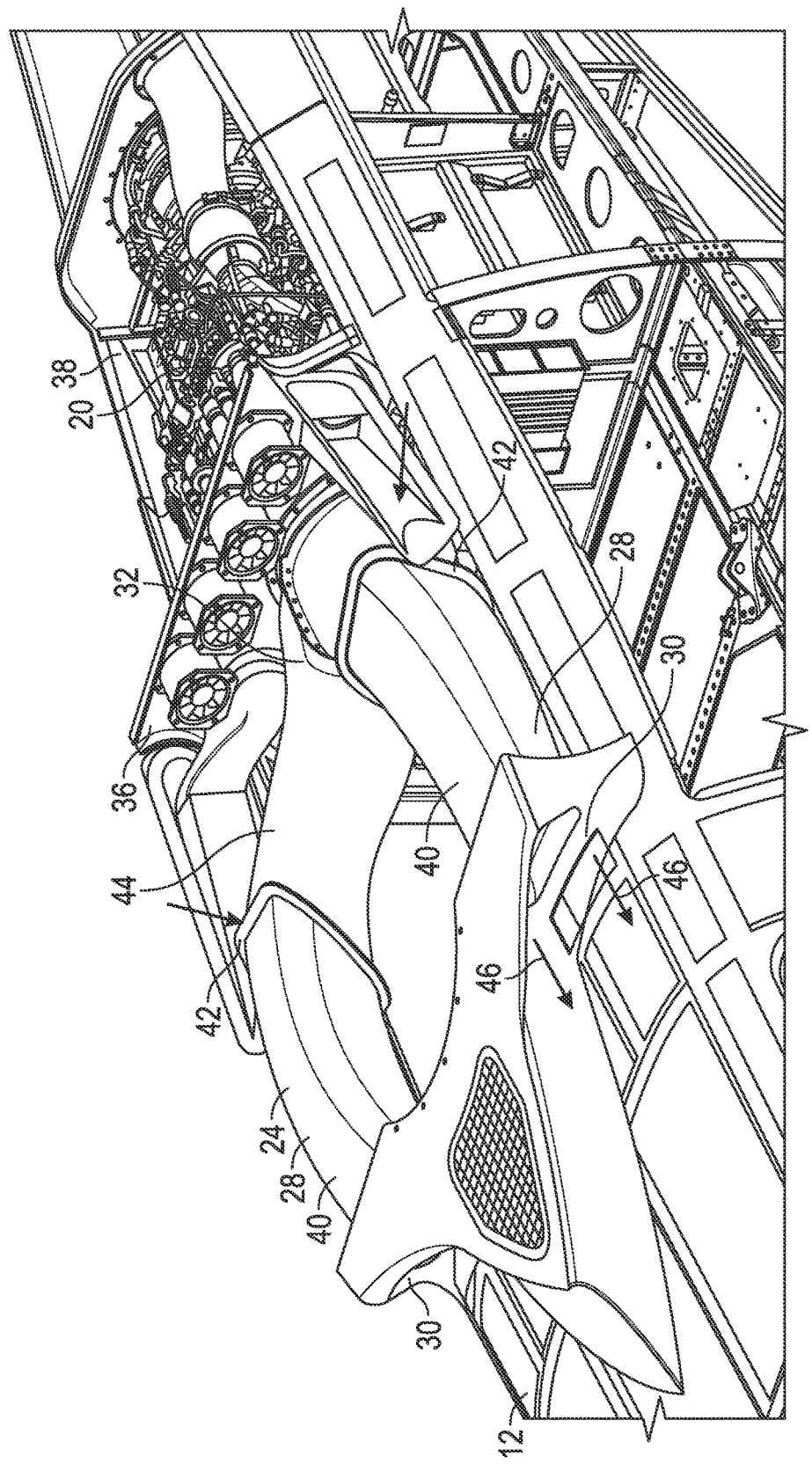
FIG. 3 is another perspective view of an embodiment of an engine inlet duct layout for a rotary winged aircraft.

Referring to FIG. 3, each duct leg 28 may be segmented, having a forward segment 40 extending from the inlet opening 30, for example to a midspan point 42, and a rear segment 44 extending from the midspan point 42 to the duct outlet 32. The forward segment 40 is joined to the rear segment 44 at the midspan point 42 by, for example, a plurality of mechanical fasteners (not shown) with a seal or gasket to seal between the forward segment 40 and the rear segment 44 to prevent leakage into and/or out of the inlet duct 24 at the midspan point 42. Segmenting the duct legs 28 increases ease of installation of the inlet duct 24, particularly of inlet ducts 24 having long spans, and also allows for inspection of the inlet duct 24 interior by removal of one of the segments. The duct legs 28 are fixed at the inlet openings 30 with mechanical fasteners, such as screws 46, with a gasket (not shown) to seal between the inlet opening 30 and the duct leg 28 to prevent airflow leakage.

Figure 4:
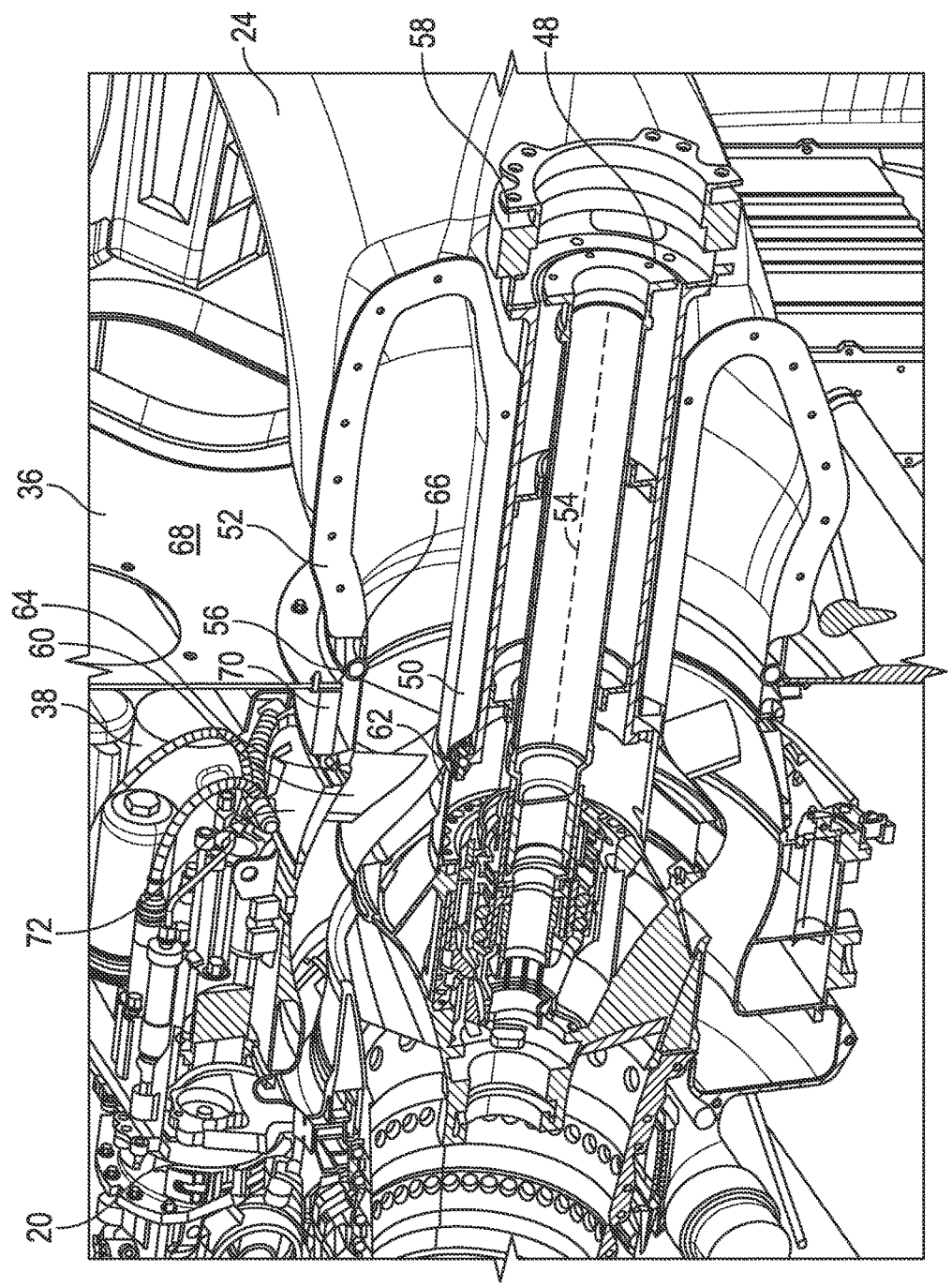
FIG. 4 is a cross-sectional view of an embodiment of an engine inlet duct layout.

Referring now to FIG. 4, the engine 20 is connected to the gearbox 22 by a rotating engine shaft 48, with the inlet duct 24 surrounding the engine shaft 48. In cross-section, as shown in FIG. 4, the inlet duct 24 has a radially inboard leg 50 and a radially outboard leg 52, relative to an engine shaft axis 54. The inlet duct 24 extends into the engine compartment 38 through a firewall opening 56 in the firewall 36. The inlet duct 24 has a floating interface with the engine 20 and terminates forward of and is not fixedly secured thereto, . The radially inboard leg 50 is sealed to a shaft support 58 through which the engine shaft 48 passes, via an inboard gasket 62, and the radially outboard leg 52 is sealed to the engine firewall via an outboard bulb seal 66. These 2 seals 62 and 66 prevent air leakage past the firewall 36 from the forward compartment into the engine 20. Further, a flexible bellows 70 is provided in the engine compartment 38. The bellows 70 is formed from a high-temperature/fire tolerant material such as titanium. The bellows 70 extends circumferentially around the inlet duct 24 radially outboard of the radially outboard leg 52 and extends from an engine compartment side of the firewall 36 to a front frame 72 of the engine 20. The bellows 70 provides a flexible seal between the firewall 36 and the engine 20 to prevent engine compartment air from being ingested into the engine inlet 60 via any gaps between the inlet duct 24 and the engine inlet 60. Similarly, the bellows 70 prevents leakage of inlet duct airflow into the engine compartment 38. Leakage of inlet duct air into the engine compartment 38 and/or ingestion of high temperature engine compartment airflow into the engine inlet 60, reduces engine performance and results in a reduction of power.

The floating installation of the inlet duct 24 at the engine 20 prevents installation issues resulting from manufacturing or assembly tolerance stackup issues between the various components. Further, the installation scheme reduces stresses on the inlet duct 24 or the engine 20 resulting from airframe 12 deflection during operation of the helicopter 10. Further, the floating interface increases ease of installation of the inlet duct 24, as the installation location at the engine inlet 60 is often difficult to access with installation tools.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An engine inlet assembly comprising:
    an inlet duct including a first inlet duct leg and a second inlet duct leg, the first inlet duct leg and the second inlet duct leg extending toward a common inlet duct outlet disposed at an engine inlet;
    the first inlet duct leg and the second inlet duct leg fixedly secured to an airframe of an aircraft at an air inlet; and
    the inlet duct outlet having a floating interface with the engine inlet, wherein the inlet duct extends through an opening in a firewall such that a free end of the common inlet duct outlet is located within an engine compartment of the aircraft at a position upstream of the engine inlet.

2. The engine inlet assembly of claim 1, wherein the firewall has an airtight seal to the engine inlet radially outboard on the inlet duct via a flexible bellows seal to prevent ingestion of an engine compartment airflow into the engine inlet.

3. The engine inlet assembly of claim 1, further comprising a bulb seal disposed at the firewall to seal between an exterior of the inlet duct and a firewall opening.

4. The engine inlet assembly of claim 3, wherein the inlet duct is partially supported by the bulb seal at the firewall.

5. The engine inlet assembly of claim 1, wherein the inlet duct at least partially surrounds an engine shaft and is sealed with a gasket to the shaft support to seal at the interior of the inlet duct.

6. The engine inlet assembly of claim 1, wherein each inlet duct leg is segmented between air inlet and the duct outlet.

7. A rotary winged aircraft comprising:
    an airframe;
    a main rotor assembly;
    an engine disposed at the airframe and operably connected to the main rotor assembly to drive the main rotor assembly; and
    an inlet duct to direct an airflow to an engine inlet including:
    a first inlet duct leg and a second inlet duct leg, the first inlet duct leg and the second inlet duct leg extending toward a common inlet duct outlet disposed at the engine inlet;
    the first inlet duct leg and the second inlet duct leg fixedly secured to the airframe at an air inlet; and
    the inlet duct outlet having a floating interface with the engine inlet, wherein the inlet duct extends through an opening in a firewall such that a free end of the common inlet duct outlet is located within an engine compartment of the aircraft at a position upstream of the engine inlet.

8. The aircraft of claim 7, wherein the firewall has an airtight seal to the engine inlet radially outboard on the inlet duct via a flexible bellows seal to prevent ingestion of an engine compartment airflow into the engine inlet.

9. The aircraft of claim 7, further comprising a bulb seal disposed at the firewall to seal between an exterior of the inlet duct and a firewall opening.

10. The aircraft of claim 7, wherein the inlet duct at least partially surrounds and is sealed to an engine shaft support connecting the engine to main rotor assembly.

11. The aircraft or claim 7, wherein the inlet duct is partially supported by a bulb seal disposed at the firewall.

12. The aircraft of claim 7, wherein each inlet duct leg is segmented between air inlet and the duct outlet.

13. The aircraft of claim 7, wherein the first inlet duct leg and the second inlet duct leg are disposed at opposing sides of the main rotor assembly.

* * * * *